(12) United States Patent
Kim et al.

(10) Patent No.: US 10,769,475 B2
(45) Date of Patent: Sep. 8, 2020

(54) METHOD OF IDENTIFYING OBJECTS BASED ON REGION OF INTEREST AND ELECTRONIC DEVICE SUPPORTING THE SAME

(71) Applicant: Samsung Electronics Co., Ltd., Suwon-si (KR)

(72) Inventors: Moojung Kim, Seongnam-si (KR); Daehee Kim, Suwon-si (KR); Daekyu Shin, Suwon-si (KR); Sungdae Cho, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 97 days.

(21) Appl. No.: 16/108,980

(22) Filed: Aug. 22, 2018

(65) Prior Publication Data

US 2019/0065879 A1    Feb. 28, 2019

(30) Foreign Application Priority Data

Aug. 22, 2017    (KR) .......................... 10-2017-0106133

(51) Int. Cl.
*G06K 9/32*    (2006.01)
*G06K 9/46*    (2006.01)
(Continued)

(52) U.S. Cl.
CPC ......... *G06K 9/3241* (2013.01); *G06K 9/2081* (2013.01); *G06K 9/4676* (2013.01); *G06K 9/6202* (2013.01); *G06T 7/11* (2017.01); *G06T 7/90* (2017.01); *G06F 3/03545* (2013.01); *G06F 3/0416* (2013.01); *G06T 2207/10024* (2013.01);
(Continued)

(58) Field of Classification Search
CPC .. G06K 9/3241; G06K 9/2081; G06K 9/4676; G06K 9/6202; G06T 7/11; G06T 7/90; G06T 2207/20101; G06T 2207/20104; G06F 3/03545; G06F 3/0416
See application file for complete search history.

(56) References Cited

U.S. PATENT DOCUMENTS 6,707,851 B1    3/2004  Choi et al.
8,132,096 B1*   3/2012  Widdowson ............ G06T 11/60
                                                        382/209
(Continued)

FOREIGN PATENT DOCUMENTS

KR    2000-0000823 A    1/2000
KR    10-2011-0129158 A    12/2011

*Primary Examiner* — Dominic E Rego

(57) ABSTRACT

An electronic device includes a display, and a processor functionally connected with the display. The processor is configured to output content including one or more objects through the display, receive user input for specifying at least one point in the entire region of the content, determine a portion of an entire region with respect to the at least one point as a search region, obtain a saliency map associated with the content based on the search region, and determine a region of interest of the user based on the saliency map. Alternatively, the processor is configured to obtain an index map associated with the content by dividing the entire region of the content into similar regions according to a preset criterion and determine the region of interest of the user by overlapping the saliency map and the index map. It is possible to provide other embodiments.

16 Claims, 17 Drawing Sheets

(51) Int. Cl.
  *G06K 9/62* (2006.01)
  *G06T 7/11* (2017.01)
  *G06T 7/90* (2017.01)
  *G06K 9/20* (2006.01)
  *G06F 3/0354* (2013.01)
  *G06F 3/041* (2006.01)

(52) U.S. Cl.
  CPC ............... *G06T 2207/20101* (2013.01); *G06T 2207/20104* (2013.01)

(56) References Cited

U.S. PATENT DOCUMENTS

| | | | | |
|---|---|---|---|---|
| 8,369,652 | B1 * | 2/2013 | Khosla | G06K 9/4623 382/284 |
| 9,329,762 | B1 * | 5/2016 | Schultz | G06F 40/166 |
| 9,870,617 | B2 * | 1/2018 | Piekniewski | G06K 9/4671 |
| 2008/0225127 | A1 * | 9/2008 | Ming | H04N 5/23248 348/208.99 |
| 2009/0304231 | A1 * | 12/2009 | Lu | G06K 9/3233 382/103 |
| 2009/0324088 | A1 * | 12/2009 | Chamaret | G06K 9/3241 382/195 |
| 2013/0013578 | A1 * | 1/2013 | Yang | G06F 16/532 707/706 |
| 2014/0044349 | A1 * | 2/2014 | Wang | G06F 16/5838 382/162 |
| 2014/0269901 | A1 * | 9/2014 | Shi | H04N 19/176 375/240.03 |
| 2014/0307076 | A1 * | 10/2014 | Deutsch | G08B 21/02 348/77 |
| 2015/0178786 | A1 * | 6/2015 | Claessens | G06F 16/901 705/14.66 |
| 2016/0005097 | A1 * | 1/2016 | Hsiao | G06Q 30/0631 705/26.7 |
| 2016/0139761 | A1 * | 5/2016 | Grosz | H04N 1/00188 715/769 |
| 2016/0360267 | A1 * | 12/2016 | Marilly | G06F 3/013 |
| 2017/0206440 | A1 * | 7/2017 | Schrier | G06T 5/002 |
| 2018/0028364 | A1 * | 2/2018 | Erickson | A61B 5/1079 |
| 2018/0039856 | A1 * | 2/2018 | Hara | G06T 7/11 |

* cited by examiner

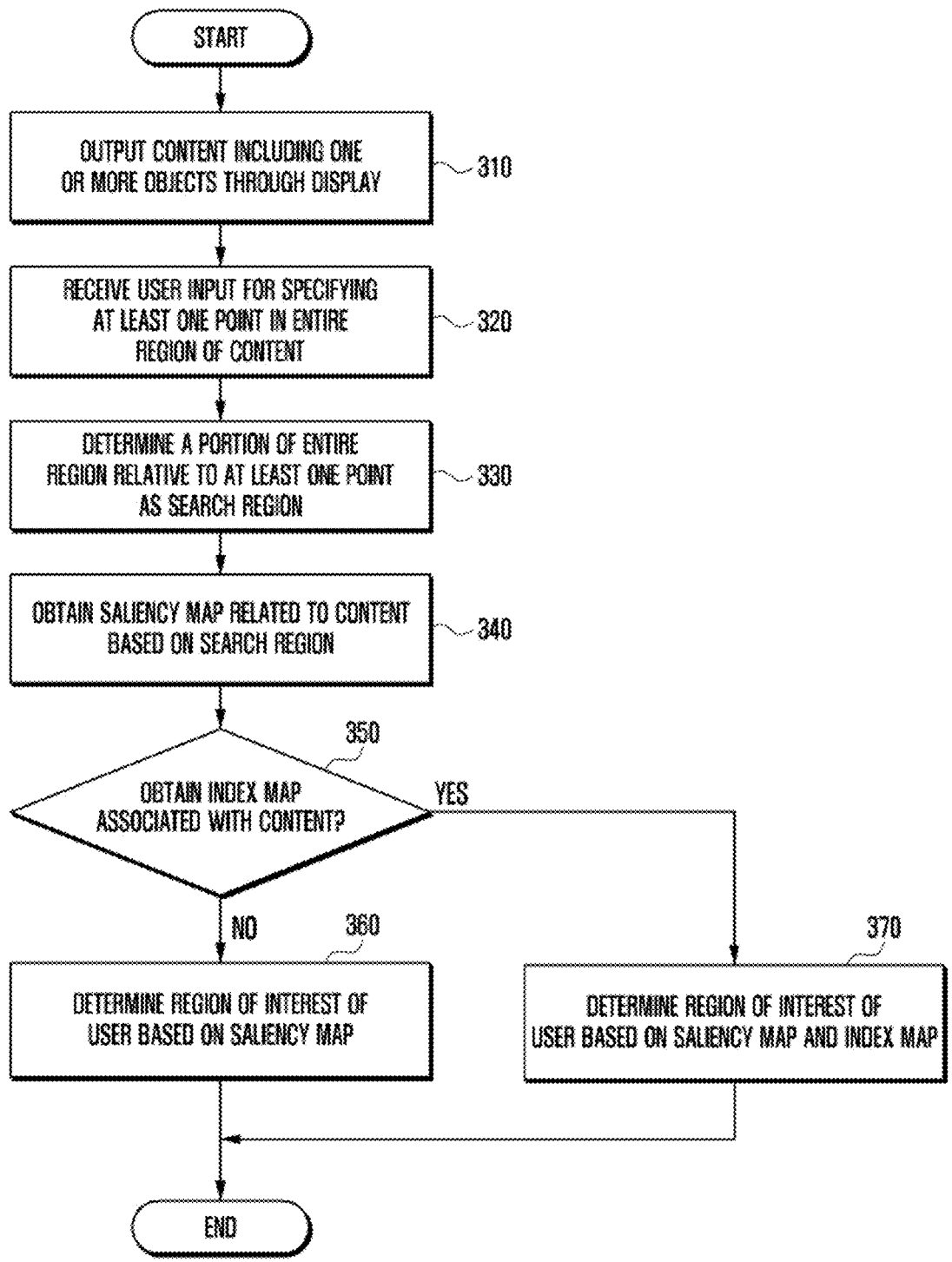

FIG. 4C
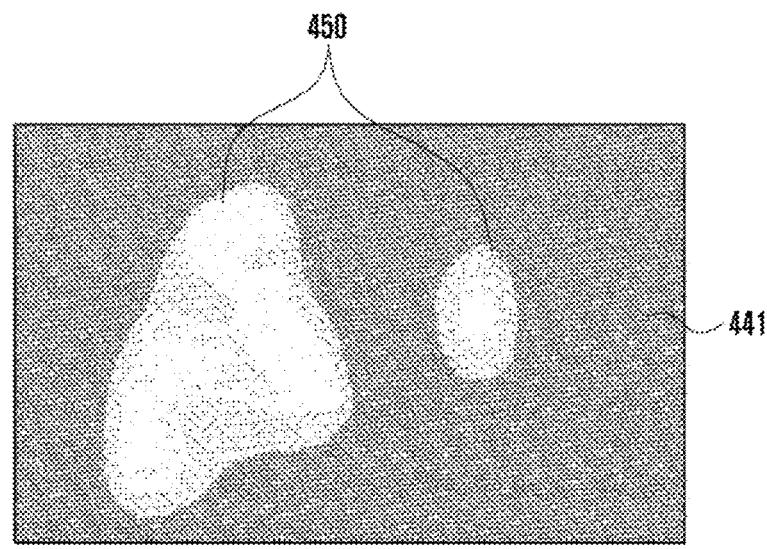
(a)
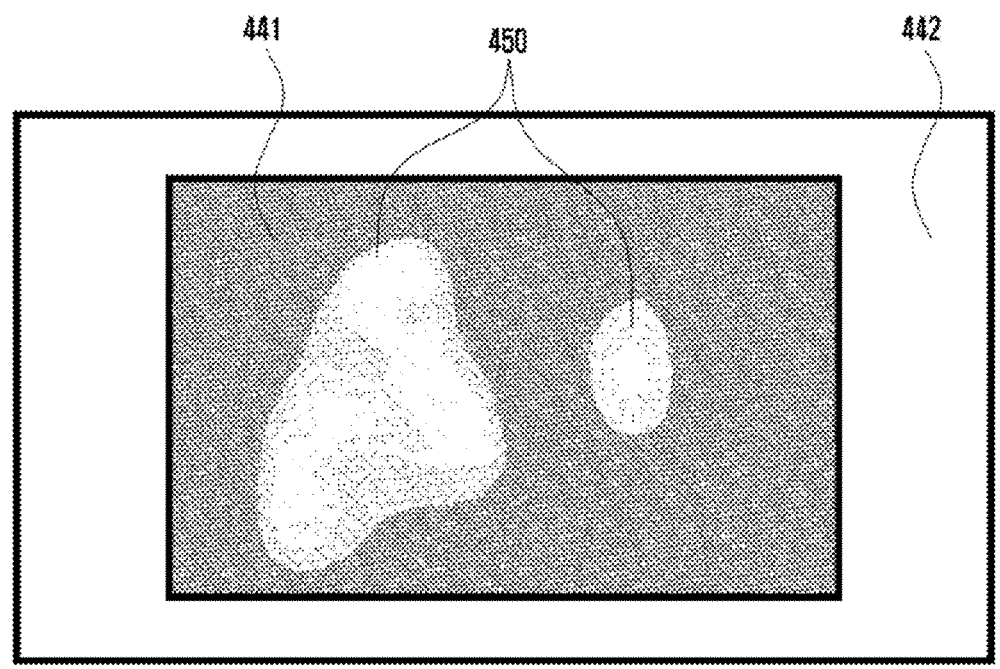
(b)

METHOD OF IDENTIFYING OBJECTS BASED ON REGION OF INTEREST AND ELECTRONIC DEVICE SUPPORTING THE SAME

CROSS-REFERENCE TO RELATED APPLICATION AND CLAIM OF PRIORITY

This application is based on and claims priority under 35 U.S.C. § 119 to Korean Patent Application No. 10-2017-0106133 filed on Aug. 22, 2017 in the Korean Intellectual Property Office, the disclosure of which is incorporated by reference herein in its entirety.

BACKGROUND

1. Field

The present invention relates to a method of identifying objects based on a region of interest (ROI) and an electronic device supporting the method.

2. Description of Related Art

Advances in information, communication, and semiconductor technologies have enabled popularization of electronic devices. Electronic devices have evolved into convergence devices supporting heterogeneous functions having originated from distinct fields. For example, such an electronic device may provide a function for identifying an object in the obtained content.

For object identification in a video, the electronic device may use a technique of comparing successive frames of the video and separating the moving object region from the background region.

For object identification in a still image, after the electronic device separates similar regions based on the color, the user may have to select a region corresponding to the object or draw a closed curve on the outline of the object.

Recently, a technique of converting the most conspicuous region in a still image into a saliency map has been used for object identification.

However, such a user-input based technique of object identification may be highly affected by the sophistication of the user input and may also require excessive interaction with the user. In the case of a saliency map technique, the object desired by the user may be not correctly identified, and the outline information of the object may be not accurately reflected.

SUMMARY

The present invention has been made in view of the above problems. Accordingly, an aspect of the present invention is to provide an object identification method based on the region of interest and an electronic device supporting the method.

In accordance with an aspect of the present invention, an electronic device is provided. The electronic device may include: a display; and a processor functionally connected with the display. The processor may be configured to: output content including one or more objects through the display; receive user input for specifying at least one point in the entire region of the content; determine a portion of the entire region with respect to the at least one point as a search region; obtain a saliency map associated with the content based on the search region; and determine the region of interest of the user based on the saliency map.

In accordance with another aspect of the present invention, there is provided a method for object identification based on the region of interest. The method may include: outputting content including one or more objects through a display; receiving user input for specifying at least one point in the entire region of the content; determining a portion of the entire region with respect to the at least one point as a search region; obtaining a saliency map associated with the content based on the search region; and determining the region of interest of the user based on the saliency map.

In a feature of the present invention, the electronic device can accurately identify an object desired by the user through a simple user input, and can provide a user interface to intuitively confirm the region of interest of the user.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 3 is a flowchart illustrating an object identification method according to various embodiments.

FIGS. 4A to 4F illustrate an example of object identification.

DETAILED DESCRIPTION

FIGS. 1 through 8C, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Figure 1:
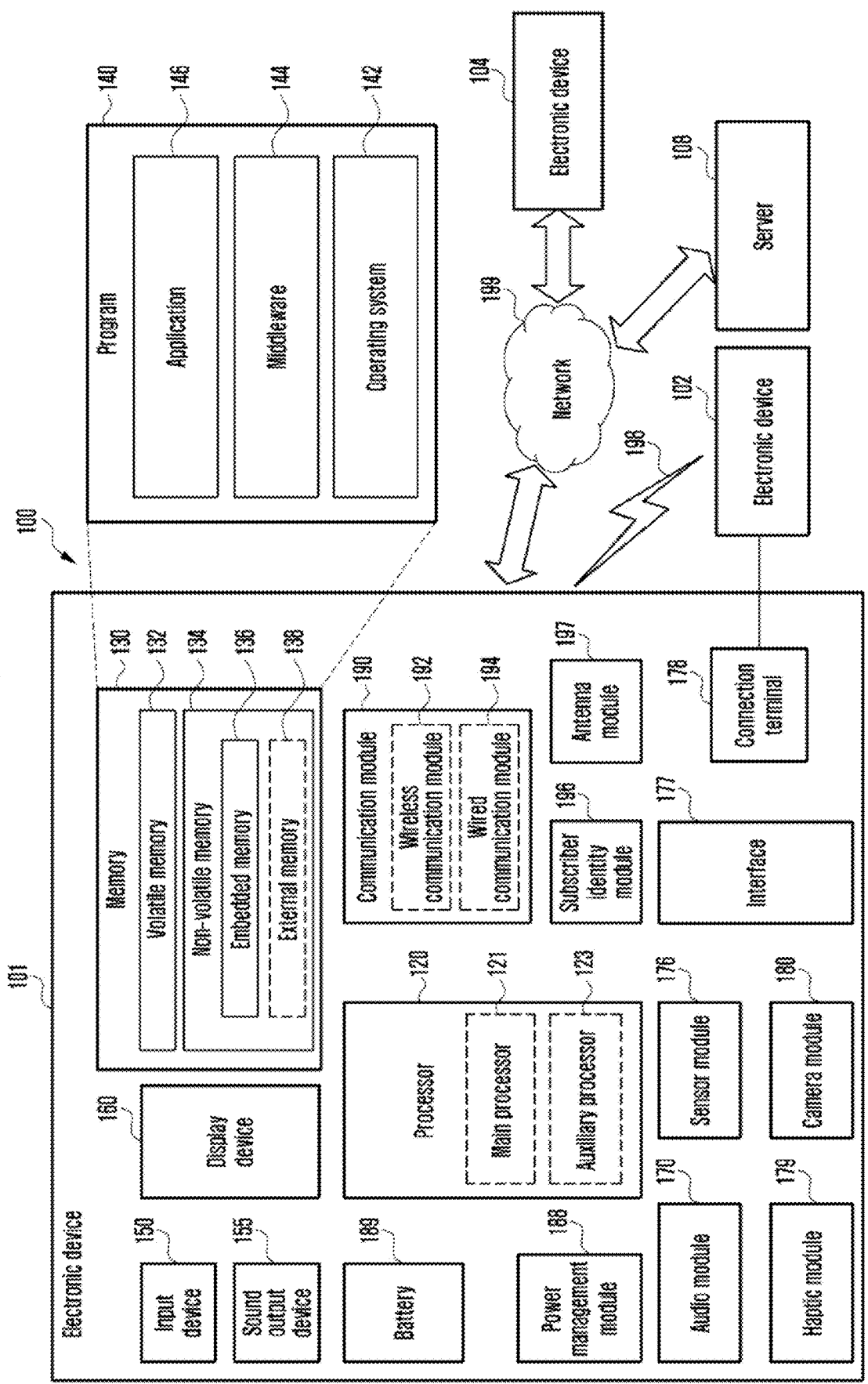
FIG. 1 illustrates a network environment including electronic devices capable of configuring a region of interest for object identification according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector), The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as BLUETOOTH, wireless-fidelity (WI-FI) direct, or infrared data association (IRDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
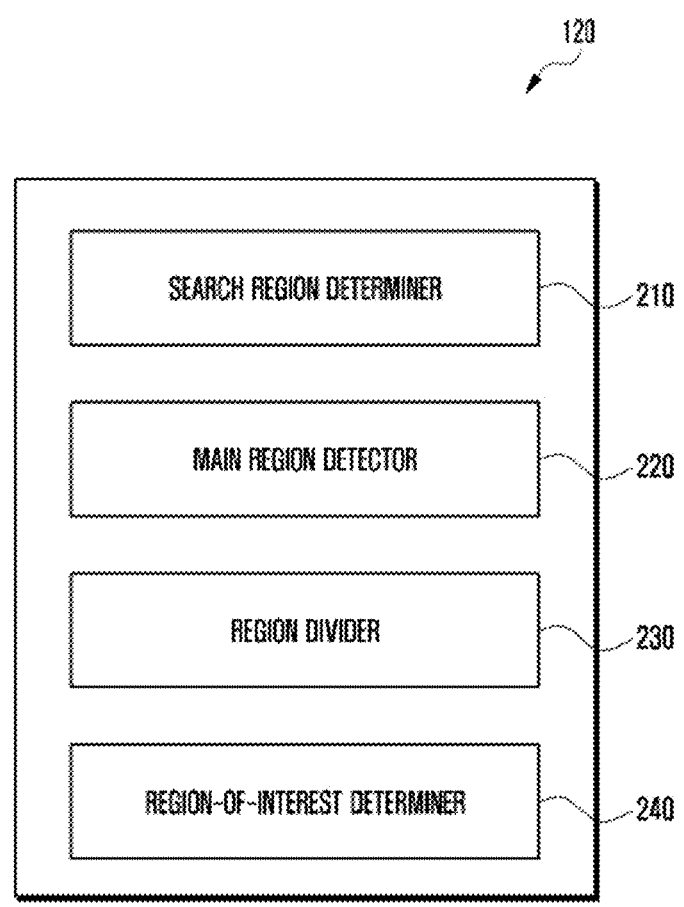
FIG. 2 illustrates a block diagram of the processor of an electronic device according to various embodiments.

FIG. 2 is a block diagram of the processor of an electronic device according to various embodiments.

In various embodiments, the processor 120 may include a search region determiner 210, a main region detector 220, a region divider 230, and a region-of-interest determiner 240. In FIG. 2, the search region determiner 210, the main region detector 220, the region divider 230, and the region-of-interest determiner 240 are shown as being included in a single processor. However, the search region determiner 210, the main region detector 220, the region divider 230, and the region-of-interest determiner 240 may belong to separate processors.

In one embodiment, the search region determiner 210 may determine a portion of the entire region of the content as a search region with respect to at least one point specified by the user. Specifically, the search region determiner 210 can examine relative variations between blocks composed of one or more pixels constituting the content and obtain an entropy map related to the content based on the relative variations. When the entropy map is obtained, the search region determiner 210 can divide the entropy map according to a specific criterion. The search region determiner 210 may identify at least one region to which the point specified by the user belongs among the divided regions and calculate the statistical characteristics of the identified region. The search region determiner 210 may identify additional regions having statistical characteristics similar to those of the identified region. Then, the search region determiner 210 may determine a search region that is composed of the at least one region to which the point specified by the user belongs and the additional regions having similar statistical characteristics.

In one embodiment, the main region detector 220 can obtain a saliency map related to the content on the basis of the search region. For example, the main region detector 220 can obtain a saliency map reflecting main regions by applying a machine-learning algorithm, a deep-learning algorithm, or an image processing algorithm to the search region. As another example, the main region detector 220 can obtain a weighted saliency map by assigning different weights to at least a portion of the saliency map based on the point specified by the user.

In one embodiment, the region divider 230 may obtain an index map related to the content by dividing the entire region of the content into similar regions based on a preset criterion. For example, the region divider 230 may apply a super-pixel algorithm to the content to divide the content into regions having the same or similar color. Then, the region divider 230 may obtain an index map related to the content by assigning an index to each of the divided regions.

In one embodiment, the region-of-interest determiner 240 may determine the region of interest (ROI) of the user on the basis of the saliency map obtained from the search region determined based on the entropy map, and the index map obtained based on the entire region of the content. The region-of-interest determiner 240 can identify an object by overlapping, e.g., the saliency map (or weighted saliency map) and the index map. For example, it is possible to identify the object corresponding to the point specified by the user by examining the size of the main region in the saliency map in consideration of the index map associated with the divided similar regions. Thereafter, the region-of-interest determiner 240 may determine the region of interest including the identified object, and draw an outline of the determined region of interest and output it through the display.

According to various embodiments of the present invention, the electronic device (e.g., electronic device 101 in FIG. 1) may include a display (e.g., display device 160 in FIG. 1) and a processor (e.g., processor 120 in FIG. 1) functionally connected with the display. The processor may be configured to: output content including one or more objects through the display; receive user input for specifying at least one point in the entire region of the content; determine a portion of the entire region as a search region with respect to the at least one point; obtain a saliency map related to the content based on the search region; and determine a region of interest of the user based on the saliency map.

In one embodiment, the processor (e.g., processor 120 in FIG. 1) of the electronic device (e.g., electronic device 101 in FIG. 1) may be configured to obtain an index map related to the content by dividing the entire region of the content into similar regions based on preset criteria. The region of interest of the user may be determined based on the saliency map and the index map.

In one embodiment, the processor (e.g., processor 120 in FIG. 1) of the electronic device (e.g., electronic device 101 in FIG. 1) may be configured to examine relative variations between blocks composed of one or more pixels constituting the content, and obtain an entropy map related to the content based on the relative variations.

In one embodiment, the processor (e.g., processor 120 in FIG. 1) of the electronic device (e.g., electronic device 101 in FIG. 1) may be configured to: divide the entropy map according to a specific criterion; identify at least one region to which the point specified by the user belongs; calculate the statistical characteristics of the identified region; find additional regions having statistical characteristics similar to those of the identified region; and determine the search region as including the identified region and the found additional regions.

In one embodiment, the processor (e.g., processor 120 in FIG. 1) of the electronic device (e.g., electronic device 101 in FIG. 1) may be configured to generate a weighting matrix based on the point specified by the user, and obtain a weighted saliency map by applying the weighting matrix to at least a portion of the saliency map.

In one embodiment, in the electronic device (e.g., electronic device 101 in FIG. 1), the preset criteria may include at least one of color, outline, and contrast.

In one embodiment, the processor (e.g., processor 120 in FIG. 1) of the electronic device (e.g., electronic device 101 in FIG. 1) may be configured to identify an object according to the point specified by the user by overlapping main regions in the saliency map and similar regions in the index map.

In one embodiment, the processor (e.g., processor 120 in FIG. 1) of the electronic device (e.g., electronic device 101 in FIG. 1) may be configured to: provide a main region of the content as a preset region of interest; and determine, if a user input is received within the preset region of interest, the region other than the preset region of interest as a non-search region.

In one embodiment, the processor (e.g., processor 120 in FIG. 1) of the electronic device (e.g., electronic device 101 in FIG. 1) may be configured to: provide a main region of the content as a preset of interest; and determine, if a user input is not received within the preset region of interest, at least a portion of the content including the preset region of interest as a non-search region.

In one embodiment, the electronic device (e.g., electronic device 101 in FIG. 1) may receive the user input by utilizing at least one of touch input using a portion of the human body (e.g., the user's body) or a pen, hovering input using a portion of the human body or a pen, and non-contact recognition.

FIG. 3 is a flowchart of an object identification method according to various embodiments.

With reference to FIG. 3, at operation 310, the processor (e.g., processor 120 in FIG. 1) of the electronic device (e.g., electronic device 101 in FIG. 1) may output content including one or more objects through the display (e.g., display device 160 in FIG. 1).

In various embodiments, the content may include various digital information such as images and videos. The content may include various types of information that the electronic device can output on the screen, such as images like pictures or photographs, preview images captured by the camera, and text data. An object can refer to anything distinct from the background in the content.

At operation 320, the processor (e.g., processor 120 in FIG. 1) of the electronic device (e.g., electronic device 101 in FIG. 1) may receive user input for specifying at least one point in the entire region of the content.

In various embodiments, the user input may include various ways of specifying at least one point in the content. The user input may be an input for specifying at least one point using an input means. When the display includes a touch panel, the user input may be a touch input for specifying at least one point using a portion of the human body (e.g., finger) or a pen. At least one point can be specified via a hovering input using a pen or a portion of the body (e.g., finger). The processor of the electronic device may specify at least one point using at least one of the non-contact recognition functions. For example, the processor can specify at least one point by recognizing the face, eye, iris, hand motion, or voice of the user through a camera or a microphone.

In various embodiments, the user may specify a plurality of points. In the description, it is assumed that the user specifies one point. When the user specifies a plurality of points, the processor can identify a plurality of objects corresponding respectively to the plurality of points specified by the user.

At operation 330, the processor (e.g., processor 120 in FIG. 1) of the electronic device (e.g., electronic device 101 in FIG. 1) may determine a portion of the entire region as a search region with respect to the at least one point.

In the case where the content includes a plurality of objects, it may be unnecessary to identify an object other than the object selected by the user. If the entire region of the content is set as the search region, an object not selected by the user may be identified. As a result, the outline information of the objects may be not accurately reflected. To identify an object corresponding to at least one point specified by the user, the processor may limit the area in which the object is to be searched to a portion of the entire region of the content.

In various embodiments, the processor can predict the region in which the object selected by the user can exist among the entire region of the content to determine the search region. Specifically, the processor (e.g., processor 120 in FIG. 1 or search region determiner 210 in FIG. 2) may examine relative variations between adjacent pixels or adjacent blocks on the basis of the information contained in pixels constituting the content or blocks including multiple pixels, and obtain an entropy map related to the content based on the relative variations between the pixels or blocks. In one embodiment, the processor may obtain an entropy map by applying the relative variations between the adjacent pixels or blocks in sequence to the content with respect to the pixel or block corresponding to the point specified by the user.

Upon obtaining the entropy map, the processor can divide the entropy map according to a given criterion. For example, the processor may divide the entropy map in various units such as 5×5 or 3×3 units. The processor may identify at least one region to which the point specified by the user belongs among the divided regions and calculate the statistical characteristics of the identified region. Then, the processor may find additional regions having statistical characteristics similar to those of the identified region.

The processor may determine the search region as including the region to which the point specified by the user belongs and the additional regions having statistical characteristics similar to those thereof. Here, the search region may be formed in one shape including at least one region to which the point specified by the user belongs. For example, if there is a region that exists separately among the regions having similar statistical characteristics, that region can be excluded from the search region.

Upon determining the search region, at operation 340, the processor (e.g., processor 120 in FIG. 1) of the electronic device (e.g., electronic device 101 in FIG. 1) may obtain a saliency map related to the content based on the search region.

In various embodiments, the processor may obtain a saliency map indicating a main region within the search region. The processor (e.g., processor 120 in FIG. 1 or main region detector 220 in FIG. 2) can obtain a saliency map reflecting main regions by applying, for example, a machine-learning algorithm, a deep-learning algorithm, or an image processing algorithm to the search region. The main region may refer to a region occupied by the objects in the search region. For example, the main region can be identified by assigning a saliency value to each pixel and aggregating those pixels having a saliency value equal to or greater than a preset threshold.

In various embodiments, the processor may assign different weights to a portion of the saliency map based on the point specified by the user. For example, the processor may generate a weighting matrix that assigns a high weight to the point specified by the user and assigns a low weight to a point far from the point specified by the user. The processor may generate a weighted saliency map by applying the weighting matrix to a portion of the saliency map. The weighted feature map may cause the object corresponding to the point specified by the user to be reflected in the main region.

At operation 350, the processor (e.g., processor 120 in FIG. 1) of the electronic device (e.g., electronic device 101 in FIG. 1) may determine whether to obtain an index map associated with the content.

In various embodiments, the processor (e.g., processor 120 in FIG. 1, or region divider 230 in FIG. 2) may divide the entire region of the content into similar regions based on a preset criterion. The processor may analyze the content in terms of color, outline, or contrast to divide the content into similar regions. The processor may apply a super-pixel algorithm to the content to divide the content into regions having the same or similar color. Then, the processor may obtain an index map related to the content by assigning an index to each of the divided regions.

In one embodiment, the operation of obtaining the index map can be omitted. For example, if an object in the content is clearly distinguished from the background, the object can be identified without use of the index map. As another example, in the case of a preview image of a camera, an object can be identified without obtaining an index map in consideration of processing speed and current consumption. Hence, the processor may determine whether to obtain an index map associated with the content, and may perform operation 360 or operation 370 based on the determination result.

In the above description, operation 350 is described as being executed after operation 330. However, the electronic device may simultaneously execute operation 330 and operation 350 using a single processor or two or more processors.

Upon determining not to obtain an index map associated with the content, at operation 360, the processor (e.g., processor 120 in FIG. 1) of the electronic device (e.g., electronic device 101 in FIG. 1) may determine the region of interest of the user on the basis of the saliency map. For example, the region corresponding to the main region in the saliency map can be determined as the region of interest of the user.

Upon determining to obtain an index map associated with the content, at operation 370, the processor (e.g., processor 120 in FIG. 1) of the electronic device (e.g., electronic device 101 in FIG. 1) may determine the region of interest of the user on the basis of the saliency map and the index map.

In various embodiments, the processor (e.g., processor 120 in FIG. 1, or region-of-interest determiner 240 in FIG. 2) can identify an object by overlapping the saliency map (or weighted saliency map) and the index map. For example, the processor can determine whether a similar region in the index map overlapping the main region in the saliency map constitutes the whole or a part of an object. If there are multiple similar regions constituting a part of the object, such similar regions can be identified in aggregate as one object. The saliency map may fail to accurately reflect the outline information of the object, and the index map may fail to accurately reflect the shape and position information of the object. Hence, it is possible to relatively accurately identify the object selected by the user by utilizing the saliency map and the index map in a complementary way.

In various embodiments, after identifying the object, the processor may determine the region of interest of the user including the identified object. For example, as an object can have an arbitrary shape, the processor can determine the region of interest including the identified object. The processor may display the region of interest on the display so that the user can intuitively recognize the region of interest. For example, the processor may draw an outline of the region of interest and output it through the display.

FIGS. 4A to 4F illustrate an example of object identification.

Figure 4A:
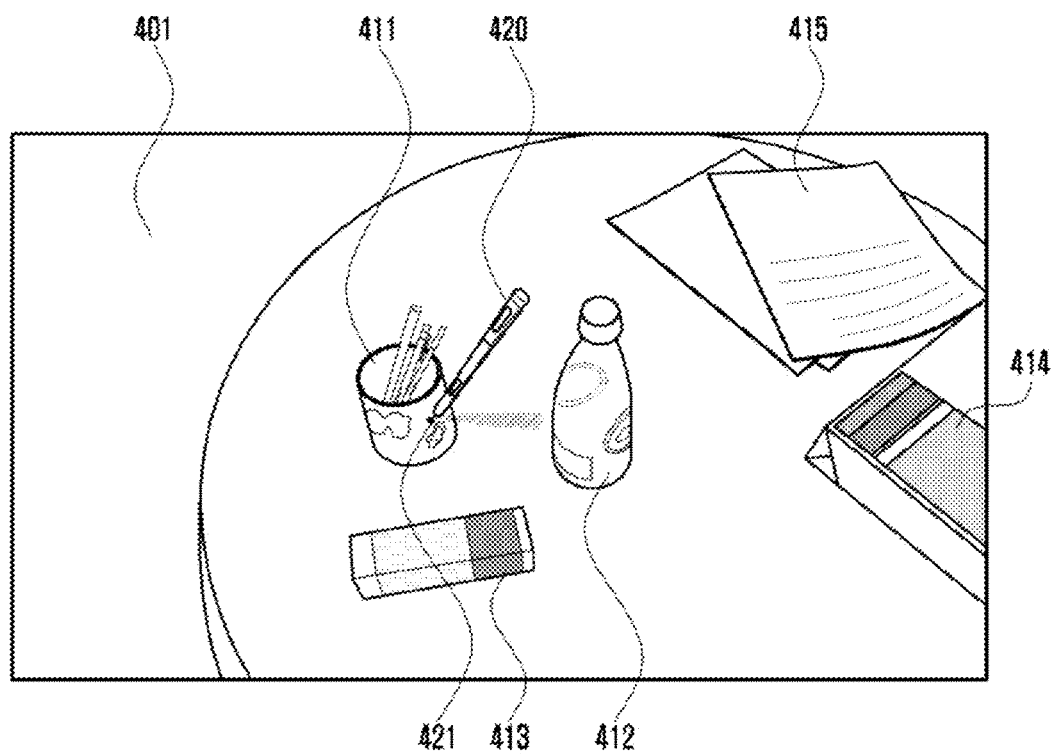

With reference to FIG. 4A, the processor (e.g., processor 120 in FIG. 1) of the electronic device (e.g., electronic device 101 in FIG. 1) may output content 401 including one or more objects through the display (e.g., display device 160 in FIG. 1). For example, the content 401 may include a first object 411, a second object 412, a third object 413, a fourth object 414, and a fifth object 415. To select the first object 411, the user may touch or hover over one point 421 of the region forming the first object 411 with the pen 420 or a finger. Alternatively, the user may specify one point 421 of the region forming the first object 411 using one of non-contact recognition functions.

Figure 4B:
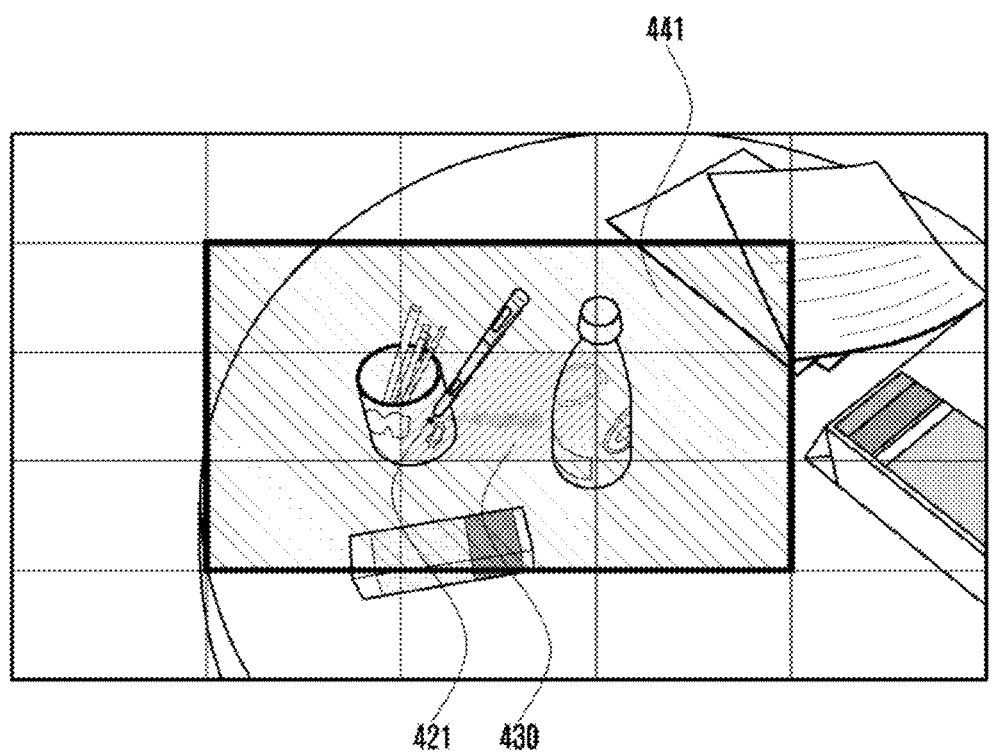

With reference to FIG. 4B, the processor (e.g., processor 120 in FIG. 1) of the electronic device (e.g., electronic device 101 in FIG. 1) may determine a portion of the entire region of the content 401 as a search region with respect to the point 421 specified by the user. For example, the electronic device may obtain an entropy map associated with the content 401 and divide the entropy map according to a certain criterion. FIG. 4B shows an example in which the entropy map is divided into 5×5 units, but the present invention is not limited thereto. The electronic device may identify at least one region 430 to which the point specified by the user belongs among the divided regions and calculate the statistical characteristics of the identified region 430. The electronic device may find additional regions 441 having statistical characteristics similar to those of the identified region 430. Then, the electronic device may determine the search region as including the region 430 to which the point specified by the user belongs and the additional regions 441 having statistical characteristics similar to those thereof. In FIG. 4B, the divided entropy map is displayed on the screen for ease of description, but the entropy map may be not displayed on the screen.

With reference to FIG. 4C, the processor (e.g., processor 120 in FIG. 1) of the electronic device (e.g., electronic device 101 in FIG. 1) may obtain a saliency map related to the content 401 based on the search region including additional regions 441. For example, as shown in part (a) of FIG. 4C, the electronic device may obtain a saliency map reflecting the main region 450 based on the determined search region. Alternatively, the electronic device may generate a weighted saliency map by applying a weighting matrix to a portion of the saliency map. Thereafter, as shown in part (b) of FIG. 4C, the processor may combine the non-search region 442 excluded from the search region with the saliency map obtained in part (c) of FIG. 4C to obtain a saliency map having the same size as the entire content. In FIG. 4C, the saliency map is displayed on the screen for ease of description, but the saliency map may be not displayed on the screen.

Figure 4D:
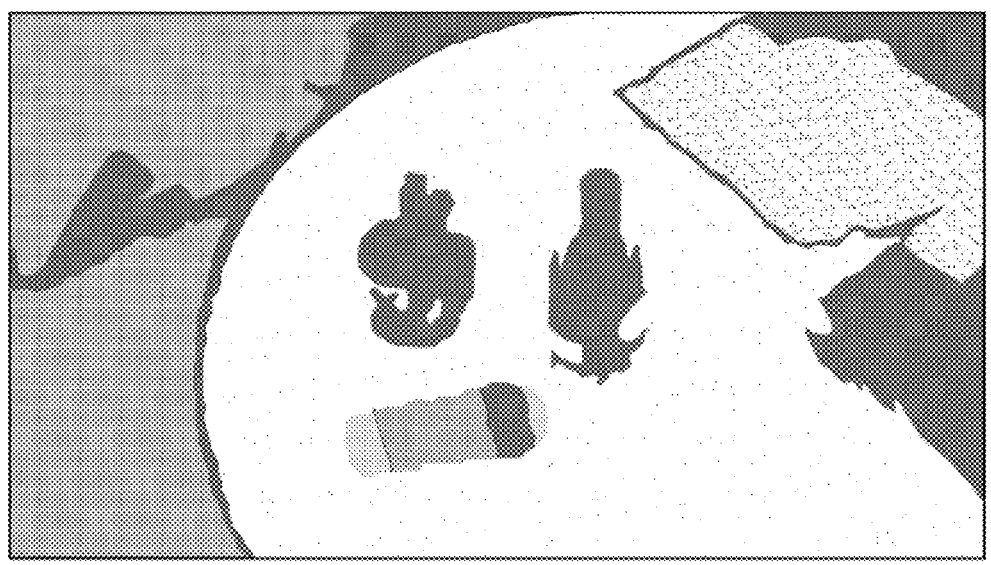

With reference to FIG. 4D, the processor (e.g., processor 120 in FIG. 1) of the electronic device (e.g., electronic device 101 in FIG. 1) may divide the content into similar regions based on a preset criterion to obtain an index map associated with the content. For example, the electronic device may analyze the entire region of the content in terms of color, outline, or contrast and obtain an index map associated with the content by dividing the content into similar regions. In FIG. 4D, the index map is displayed on the screen for ease of description, but the index map may be not displayed on the screen.

Figure 4E:
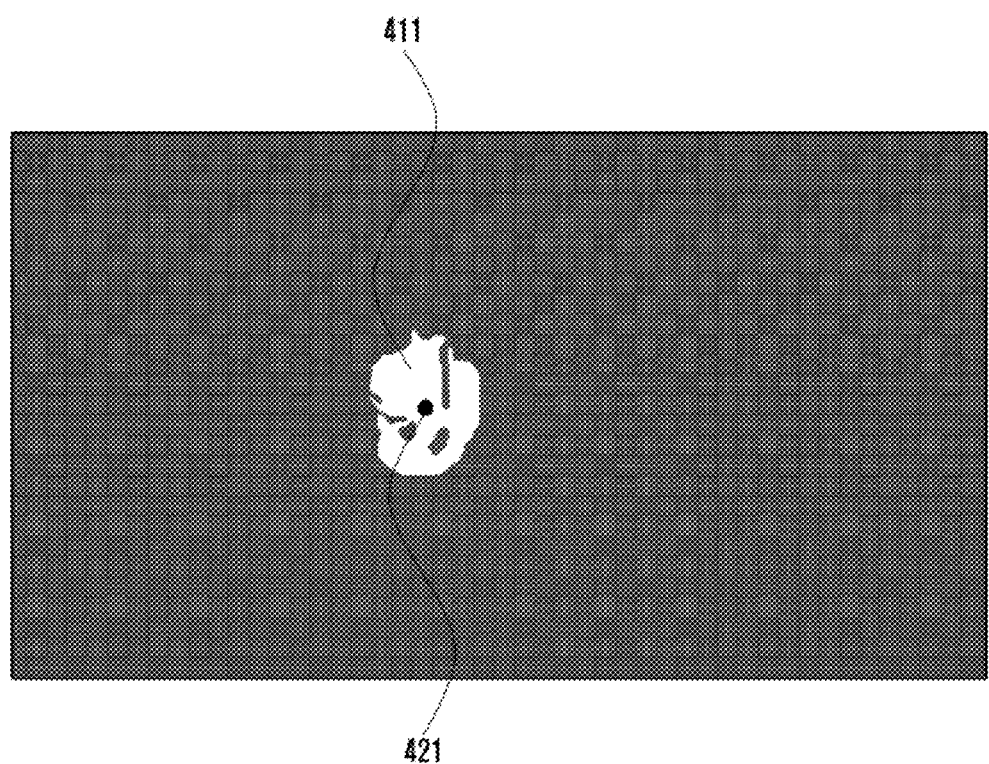

With reference to FIG. 4E, the processor (e.g., processor 120 in FIG. 1) of the electronic device (e.g., electronic device 101 in FIG. 1) may identify the object on the basis of the saliency map and the index map. For example, the processor can identify the object by overlapping the saliency map and the index map. Specifically, the processor may obtain outline information from the index map and obtain shape and position information from the saliency map, and may identify the first object 411 corresponding to the point 421 specified by the user.

Figure 4F:
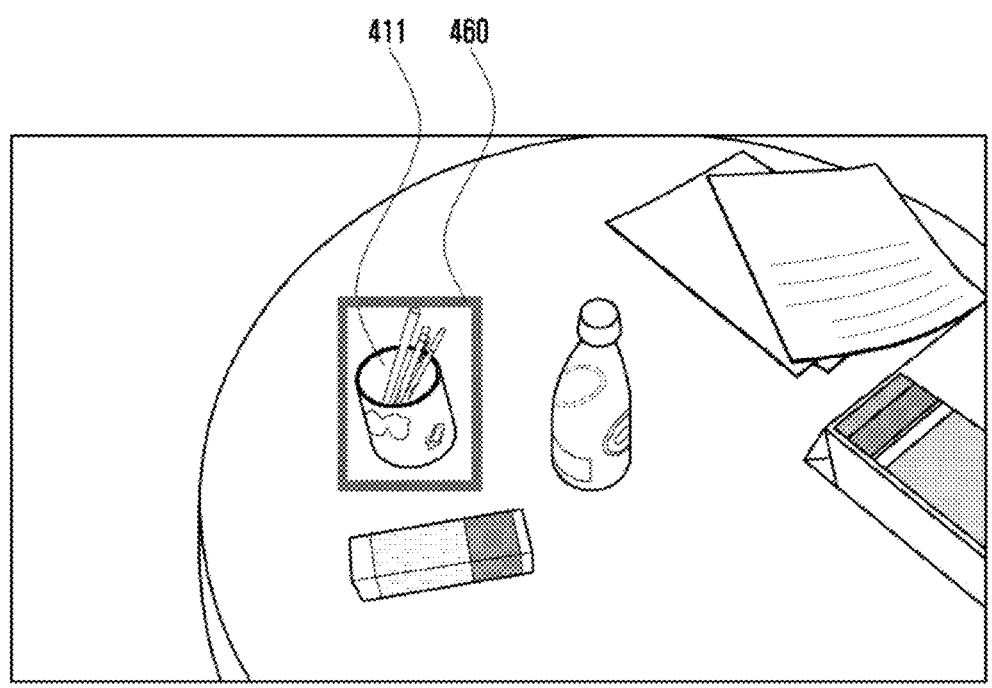

With reference to FIG. 4F, the processor (e.g., processor 120 in FIG. 1) of the electronic device (e.g., electronic device 101 in FIG. 1) may determine and display the ROI 460 of the user based on the identified first object 411. The ROI 460 may be represented in various shapes including the identified object. FIG. 4F shows a ROI of the user in the form of a box, but the present invention is not limited thereto.

Figure 5:
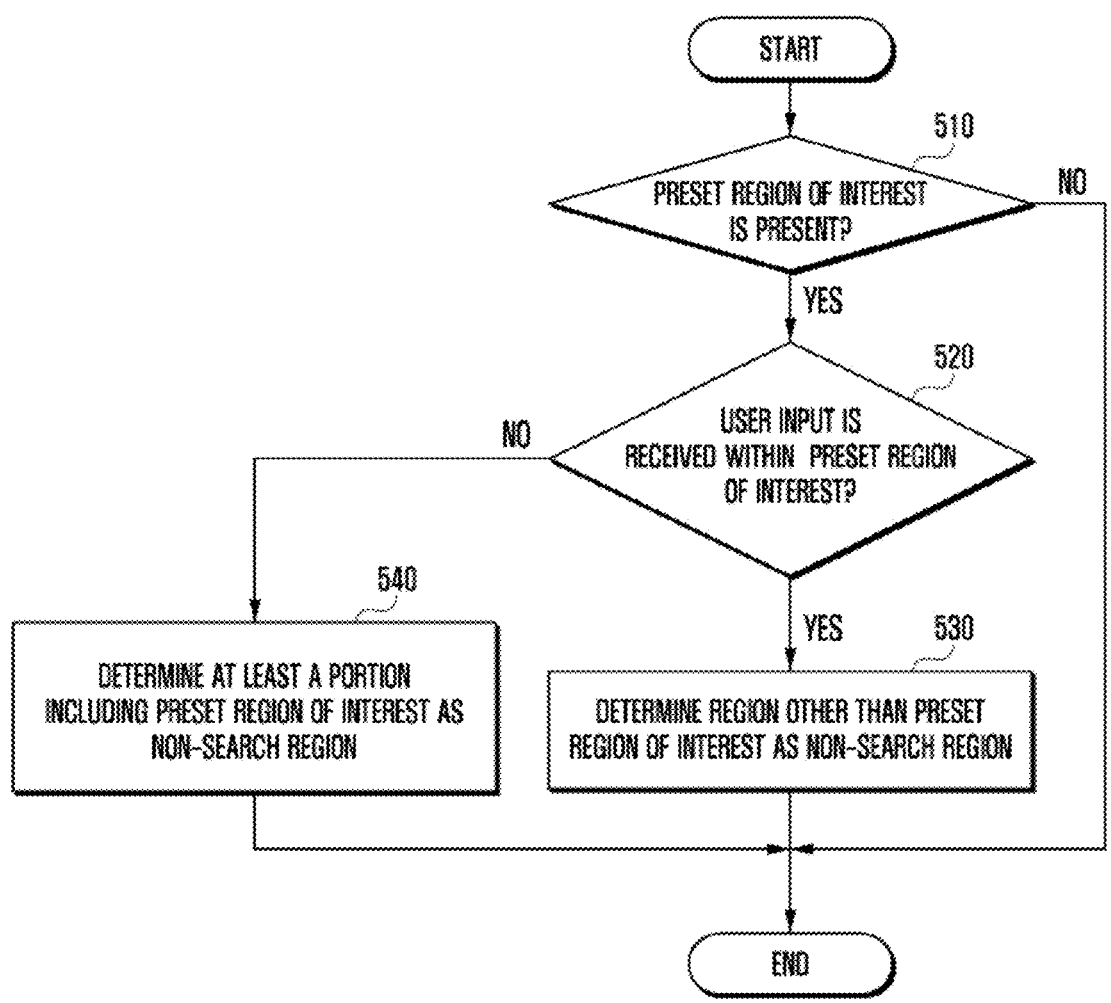
FIG. 5 is a flowchart illustrating a case where a region of interest is provided before user input.

FIG. 5 is a flowchart illustrating a case where a region of interest is provided before user input.

Prior to operation 320 in FIG. 3, the processor may provide the main region of the content as a region of interest. For example, the electronic device may obtain the saliency map associated with the entire content and provide the region of interest including the main region of the entire content before receiving user input. As another example, when the region of interest has been determined based on the previous user input, the previously determined region of interest may be provided again. In such a case, operation 320 of FIG. 3 may further include the following operations.

With reference to FIG. 5, at operation 510, the processor (e.g., processor 120 in FIG. 1) of the electronic device (e.g., electronic device 101 in FIG. 1) may determine whether a preset region of interest is present. Upon determining that a preset region of interest is present, at operation 520, the processor (e.g., processor 120 in FIG. 1) of the electronic device (e.g., electronic device 101 in FIG. 1) may determine whether user input is received within the preset region of interest. For example, the user may wish to identify at least one object in the preset region of interest. In some cases, the user may wish to identify an object located outside the preset region of interest. To determine the search region in consideration of the user's intention, the processor can identify the location where user input is received.

Upon determining that user input is received within the preset region of interest, at operation 530, the processor (e.g., processor 120 in FIG. 1) of the electronic device (e.g., electronic device 101 in FIG. 1) may determine the region other than the preset region of interest as a non-search region. That is, assuming that the object that the user wishes to identify is within the preset region of interest, the processor may not search the region other than the preset region of interest for an object.

In various embodiments, the processor may determine a specific region included in the preset region of interest as the search region. For example, the processor may obtain a saliency map associated with the content and reflecting the main region in the preset region of interest.

In one embodiment, the processor may determine a portion of the preset region of interest as a search region based on at least one point specified by user input. For example, the processor may obtain an entropy map within the preset region of interest and determine a search region based on the entropy map.

Upon determining that user input is not received within the preset region of interest, at operation 540, the processor (e.g., processor 120 in FIG. 1) of the electronic device (e.g., electronic device 101 in FIG. 1) may determine at least a portion of the content including the preset region of interest as a non-search region. That is, assuming that the object that the user wishes to identify is located outside the preset region of interest, the processor may not search the preset region of interest for an object.

In various embodiments, the non-search region may include a part of the region other than the preset region of interest. For example, if user input is received at some point on the right-hand side of the preset region of interest, the processor may assume that there is no object to be specified by the user on the left-hand side of the preset region of interest and determine both the preset region of interest and the left-hand side thereof as a non-search region. Alternatively, the processor may determine all regions except for the right-hand side of the preset region of interest as a non-search region.

When the non-search region is determined, the electronic device can determine the region other than the non-search region as a search region, and obtain a saliency map associated with the content. Alternatively, the electronic device may obtain an entropy map in a region other than the non-search region, and determine the search region based on the entropy map.

Figure 6:
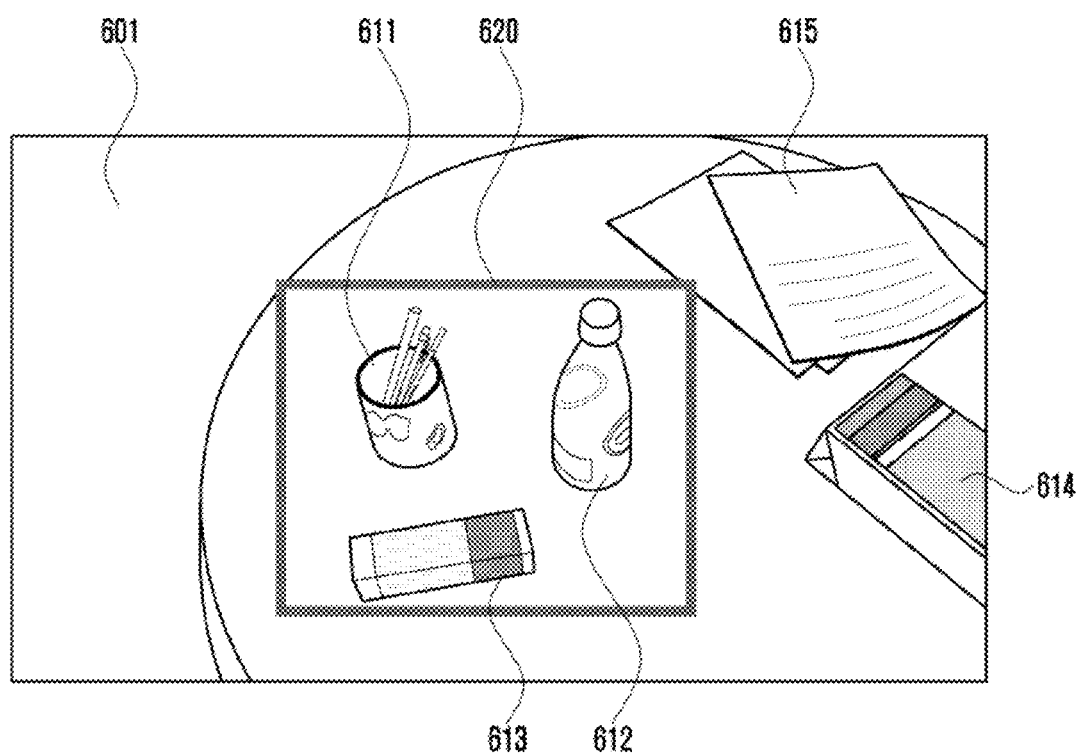
FIG. 6 illustrates an example of a region of interest provided in advance.

FIG. 6 shows an example of a ROI provided in advance.

The processor (e.g., processor 120 in FIG. 1) of the electronic device (e.g., electronic device 101 in FIG. 1) may output content 601 including one or more objects through the display (e.g., display device 160 in FIG. 1). For example, the content 601 may include a first object 611, a second object 612, a third object 613, a fourth object 614, and a fifth object 615.

In various embodiments, the processor may obtain the saliency map associated with the entire region of the content 601 and provide the ROI 620 including the main region of the entire region of the content 601 before receiving user input. Since there is no point specified by the user in the saliency map associated with the entire region of the content 601, the processor cannot obtain a weighting matrix. In addition, since the saliency map associated with the entire region of the content 601 does not accurately reflect the outline information, a plurality of separate objects (e.g., first object 611, second object 612, and third object 613) can be identified as one object.

Figure 7A:
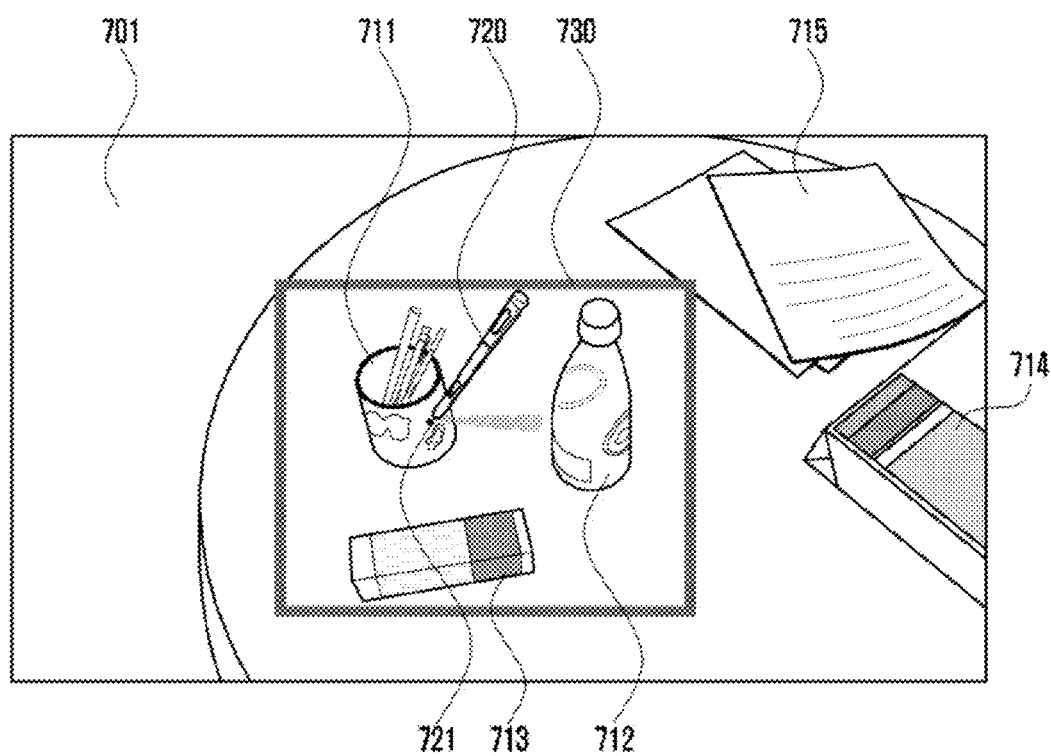
FIGS. 7A to 7C illustrate an example of object identification when user input is received within the region of interest provided in advance.
Figure 7B:
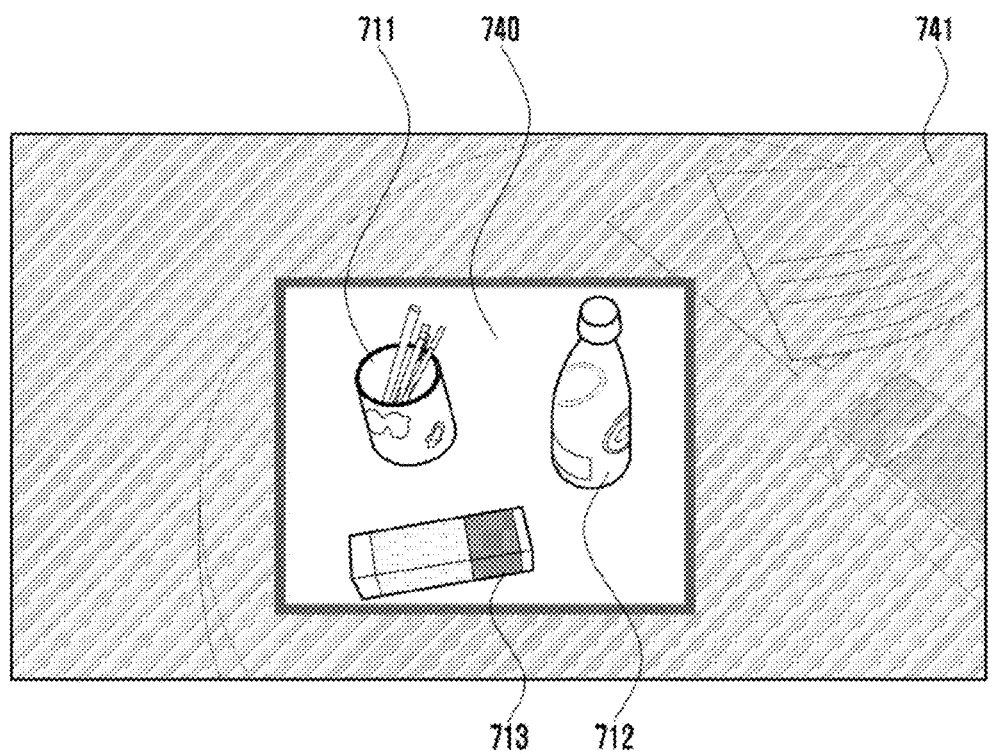
Figure 7C:
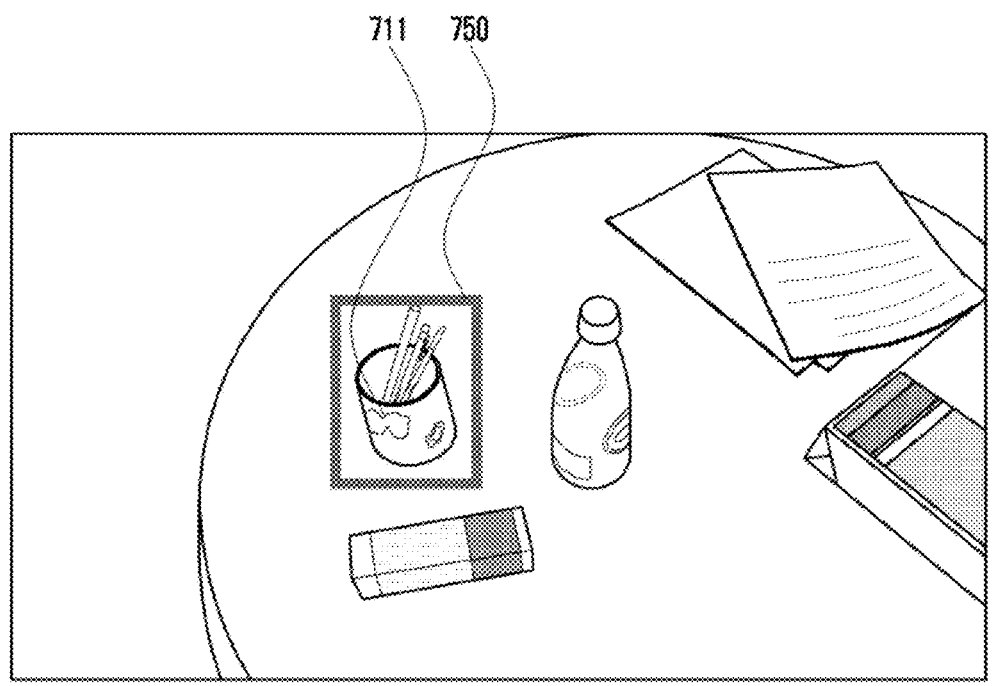

FIGS. 7A to 7C illustrate an example of object identification when user input is received within the ROI provided in advance.

With reference to FIG. 7A, the processor (e.g., processor 120 in FIG. 1) of the electronic device (e.g., electronic device 101 in FIG. 1) may output content 701 including one or more objects through the display (e.g., display device 160 in FIG. 1). For example, the content 701 may include a first object 711, a second object 712, a third object 713, a fourth object 714, and a fifth object 715. The processor may obtain the saliency map associated with the entire region of the content 701 and provide a preset ROI 730 including the main region of the entire region of the content 701 before receiving user input.

Thereafter, the processor may receive user input for specifying at least one point and may determine whether the user input is received within the preset ROI 730. For example, to select the first object 711 contained in the preset ROI 730, the user may touch or hover over one point 721 of the region forming the first object 711 with the pen 720 or a finger. Alternatively, the user may specify one point 721 of the region forming the first object 711 using one of non-contact recognition functions. At this time, the electronic device can determine that user input has been received within the preset ROI.

With reference to FIG. 7B, the processor (e.g., processor 120 in FIG. 1) of the electronic device (e.g., electronic device 101 in FIG. 1) may determine the region other than the preset ROI 730 as the non-search region 741. The processor may determine the preset ROI 730 as the search region 740. In one embodiment, the electronic device may determine a portion of the preset ROI 730 relative to at least one point specified by user input as a search region. For example, the electronic device may obtain an entropy map associated with the content within the preset ROI 730 and determine the search region based on the entropy map.

With reference to FIG. 7C, after determining the search region, the processor of the electronic device may obtain a saliency map associated with the content based on the search region, and determine a user's ROI 750 including the first object 711 based on the saliency map. In one embodiment, the processor may obtain an index map associated with the content by dividing the entire region of the content 701 into similar regions according to a preset criterion, and determine a user's ROI 750 including the first object 711 based on the saliency map and the index map. The ROI 750 may be represented in various shapes including the identified first object 711. FIG. 7C shows a ROI in the form of a box, but the present invention is not limited thereto.

Figure 8A:
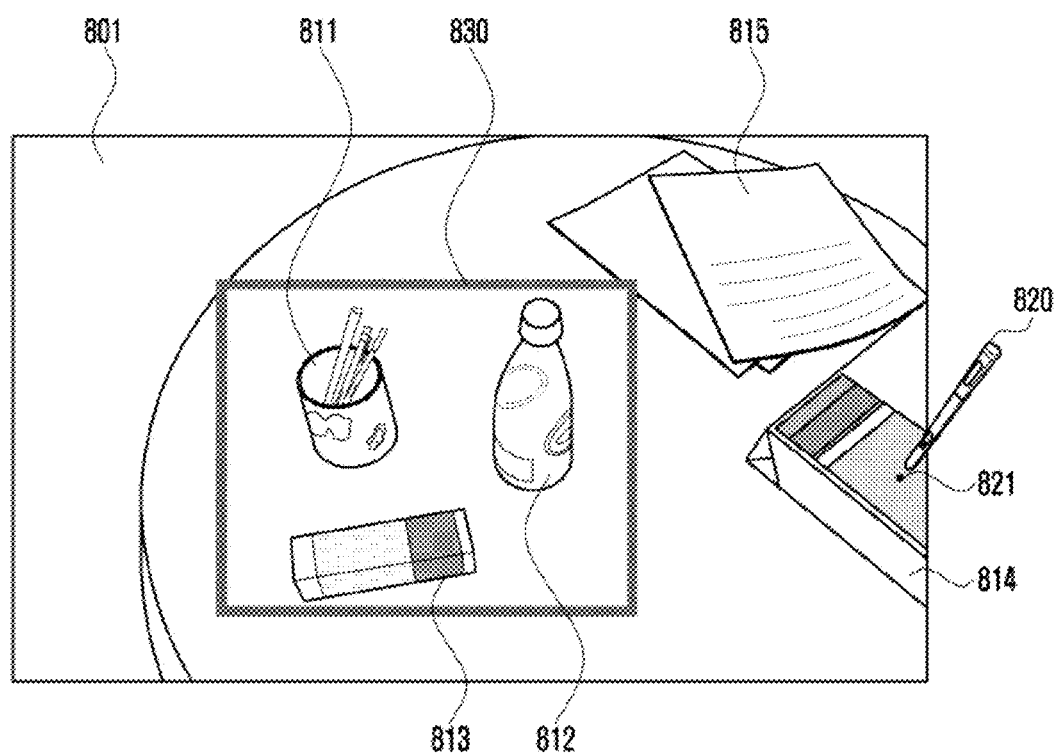
FIGS. 8A to 8C illustrate an example of object identification when user input is received outside the region of interest provided in advance.
Figure 8B:
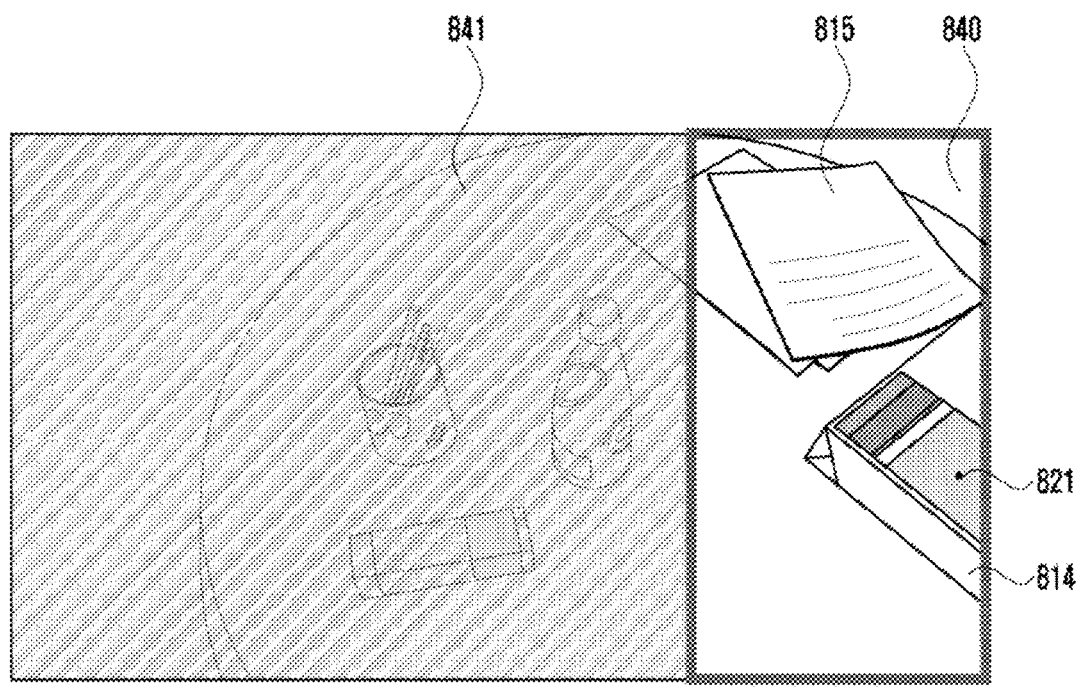
Figure 8C:
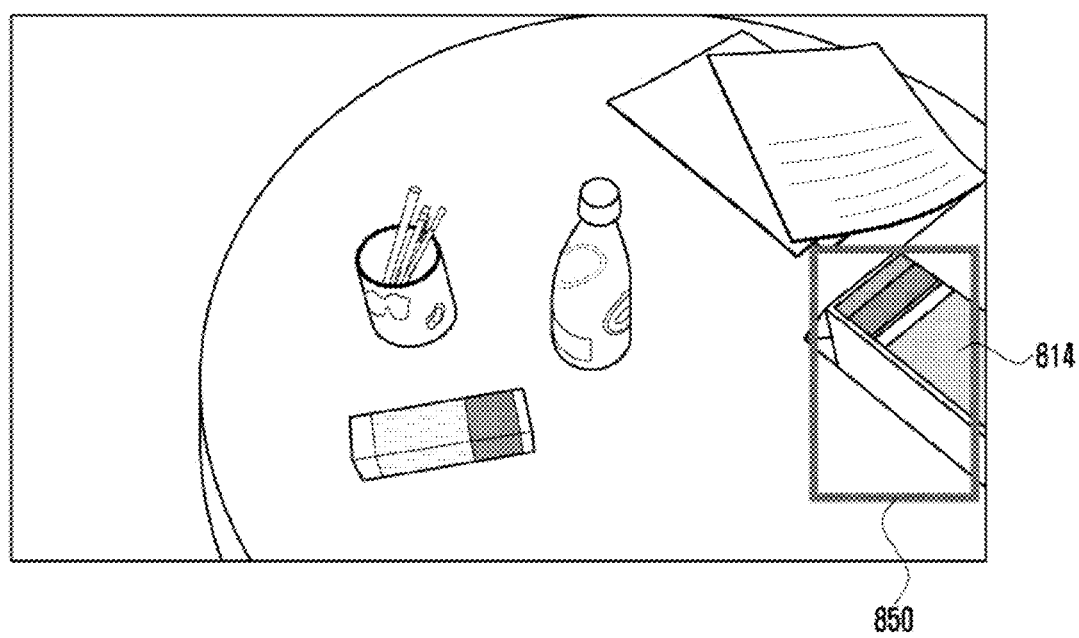

FIGS. 8A to 8C illustrate an example of object identification when user input is received outside the ROI provided in advance.

With reference to FIG. 8A, the processor (e.g., processor 120 in FIG. 1) of the electronic device (e.g., electronic device 101 in FIG. 1) may output content 801 including one or more objects through the display (e.g., display device 160 in FIG. 1). For example, the content 801 may include a first object 811, a second object 812, a third object 813, a fourth object 814, and a fifth object 815. The processor may obtain the saliency map associated with the entire region of the content 801 and provide a preset ROI 830 including the main region of the entire region of the content 801 before receiving user input.

Thereafter, the processor may receive user input for specifying at least one point and may determine whether the user input is received within the preset region of interest 830. For example, to select the fourth object 814 located outside the preset region of interest 830, the user may touch or hover over one point 821 of the region forming the fourth object 814 with the pen 820 or a finger. Alternatively, the user may specify one point 821 of the region forming the fourth object 814 using one of non-contact recognition functions. At this time, the electronic device can determine that user input has been received outside the preset region of interest 830.

With reference to FIG. 8B, the processor (e.g., processor 120 in FIG. 1) of the electronic device (e.g., electronic device 101 in FIG. 1) may determine a region including the preset region of interest 830 as the non-search region 841. For example, the processor may assume that the object that the user wishes to specify is outside the preset region of interest 830 and may not search the preset region of interest 830 for the object. In FIG. 8B, the electronic device assumes that user input is received at some point on the right-hand side of the preset region of interest 830, and determines all the region except for the right-hand side of the preset region of interest 830 as the non-search region 841. Alternatively, the electronic device may determine the preset region of interest 830 as a non-search region, or may determine both the preset region of interest 830 and the left-hand side thereof as a non-search region.

When the non-search region 841 is determined, the electronic device can determine the region other than the non-search region 841 as a search region, and obtain a saliency map associated with the content 801. Alternatively, the electronic device may obtain an entropy map in a region other than the non-search region, and determine the search region based on the entropy map.

With reference to FIG. 8C, after determining the search region, the processor (e.g., processor 120 in FIG. 1) of the electronic device (e.g., electronic device 101 in FIG. 1) may obtain a saliency map associated with the content based on the search region 840, and determine a user's region of interest 850 based on the saliency map. In one embodiment, the processor may obtain an index map associated with the content by dividing the entire region of the content into similar regions according to a preset criterion, and determine a user's region of interest 850 based on the saliency map and the index map. The region of interest 850 may be represented in various shapes including the identified object. FIG. 8C shows a ROI in the form of a box, but the present invention is not limited thereto.

According to various embodiments of the present invention, the method for object identification based on the region of interest may include: outputting content including one or more objects through a display (e.g., operation 310 in FIG. 3); receiving user input for specifying at least one point in the entire region of the content (e.g., operation 320 in FIG. 3); determining a portion of the entire region with respect to the at least one point as a search region (e.g., operation 330 in FIG. 3); obtaining a saliency map associated with the content based on the search region (e.g., operation 340 in FIG. 3); and determining a region of interest of the user on the basis of the saliency map (e.g., operation 360 in FIG. 3).

In one embodiment, the object identification method based on the region of interest may further include obtaining an index map associated with the content by dividing the entire region of the content into similar regions according to a preset criterion (e.g., operation 350 in FIG. 3). The region of interest of the user may be determined on the basis of the saliency map and the index map (e.g., operation 370 in FIG. 3).

In one embodiment, the object identification method based on the region of interest may further include examining relative variations between one or more pixels constituting the content or blocks including multiple pixels and obtaining an entropy map related to the content based on the relative variations.

In one embodiment, the object identification method based on the region of interest may further include: dividing the entropy map according to a specific criterion; identifying at least one region to which the point specified by the user belongs; calculating the statistical characteristics of the identified region; finding additional regions having statistical characteristics similar to those of the identified region; and determining the search region as including the identified region and the found additional regions.

In one embodiment, the object identification method based on the region of interest may further include: generating a weighting matrix based on the point specified by the user; and obtaining a weighted saliency map by applying the weighting matrix to at least a portion of the saliency map.

In one embodiment, the preset criterion may be at least one of color, outline, and contrast.

In one embodiment, the object identification method based on the region of interest may further include identifying an object according to the point specified by the user by overlapping main regions in the saliency map and similar regions in the index map.

In one embodiment, the object identification method based on the region of interest may further include: providing a main region of the content as a preset region of interest (e.g., operation 510 in FIG. 5); and determining, if a user input is received within the preset region of interest, a region other than the preset region of interest as a non-search region (e.g., operation 530 in FIG. 5).

In one embodiment, the object identification method based on the region of interest may further include: providing a main region of the content as a preset region of interest (e.g., operation 510 in FIG. 5); and determining, if a user input is not received within the preset region of interest, at least a portion of the content including the preset region of interest as a non-search region (e.g., operation 540 in FIG. 5).

In one embodiment, the user input for the object identification method may be received by utilizing at least one of touch input using a portion of the human body or a pen, hovering input using a portion of the human body or a pen, and non-contact recognition.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising:
a display; and
a processor functionally connected with the display,
wherein the processor is configured to:
output content including one or more objects through the display;
receive user input for specifying at least one point in an entire region of the content;
determine a portion of the entire region with respect to the at least one point as a search region;
obtain a saliency map associated with the content based on the search region;
obtain an index map associated with the content by dividing the entire region of the content into similar regions according to a preset criterion; and
determine a region of interest of a user based on the saliency map and the index map.

2. The electronic device of claim 1, wherein the processor is further configured to:
examine relative variations between one or more pixels constituting the content or blocks including multiple pixels; and
obtain an entropy map related to the content based on the relative variations.

3. The electronic device of claim 2, wherein the processor is further configured to:
divide the entropy map according to a specific criterion;
identify at least one region to which the point specified by the user belongs;
calculate statistical characteristics of the at least one identified region;

find additional regions including statistical characteristics similar to those of the at least one identified region; and determine the search region as including the at least one identified region and the found additional regions.

4. The electronic device of claim 1, wherein the processor is further configured to:

generate a weighting matrix based on the point specified by the user; and obtain a weighted saliency map by applying the weighting matrix to at least a portion of the saliency map.

5. The electronic device of claim 1, wherein the preset criterion is at least one of color, outline, or contrast.

6. The electronic device of claim 1, wherein the processor is further configured to identify an object according to the point specified by the user by overlapping main regions in the saliency map and similar regions in the index map.

7. The electronic device of claim 1, wherein the processor is further configured to:

provide a main region of the content as a preset region of interest; and determine, when the user input is received within the preset region of interest, a region other than the preset region of interest as a non-search region.

8. The electronic device of claim 1, wherein the processor is configured to:

provide a main region of the content as a preset region of interest; and determine, when the user input is received outside the preset region of interest, at least a portion of the content including the preset region of interest as a non-search region.

9. A method for object identification based on a region of interest, the method comprising:

outputting content including one or more objects through a display;

receiving user input for specifying at least one point in an entire region of the content;

determining a portion of the entire region with respect to the at least one point as a search region;

obtaining a saliency map associated with the content based on the search region;

obtaining an index map associated with the content by dividing the entire region of the content into similar regions according to a preset criterion; and determining a region of interest of a user based on the saliency map and the index map.

10. The method of claim 9, further comprising:

examining relative variations between one or more pixels constituting the content or blocks including multiple pixels; and obtaining an entropy map related to the content based on the relative variations.

11. The method of claim 10, further comprising:

dividing the entropy map according to a specific criterion;

identifying at least one region to which the point specified by the user belongs;

calculating statistical characteristics of the at least one identified region;

finding additional regions including statistical characteristics similar to those of the at least one identified region; and determining the search region as including the at least one identified region and the found additional regions.

12. The method of claim 10, further comprising:

generating a weighting matrix based on the point specified by the user; and obtaining a weighted saliency map by applying the weighting matrix to at least a portion of the saliency map.

13. The method of claim 9, wherein the preset criterion is at least one of color, outline, or contrast.

14. The method of claim 9, further comprising identifying an object according to the point specified by the user by overlapping main regions in the saliency map and similar regions in the index map.

15. The method of claim 9, further comprising:

providing a main region of the content as a preset region of interest; and determining, when the user input is received within the preset region of interest, a region other than the preset region of interest as a non-search region.

16. The method of claim 9, further comprising:

providing a main region of the content as a preset region of interest; and determining, when the user input is received outside the preset region of interest, at least a portion of the content including the preset region of interest as a non-search region.

* * * * *